N. E. DAVIES.
REVERSING PROPELLER.
APPLICATION FILED APR. 7, 1920.

1,378,401.

Patented May 17, 1921.
4 SHEETS—SHEET 1.

INVENTOR.
Nelson E. Davies, by

ATTORNEY.

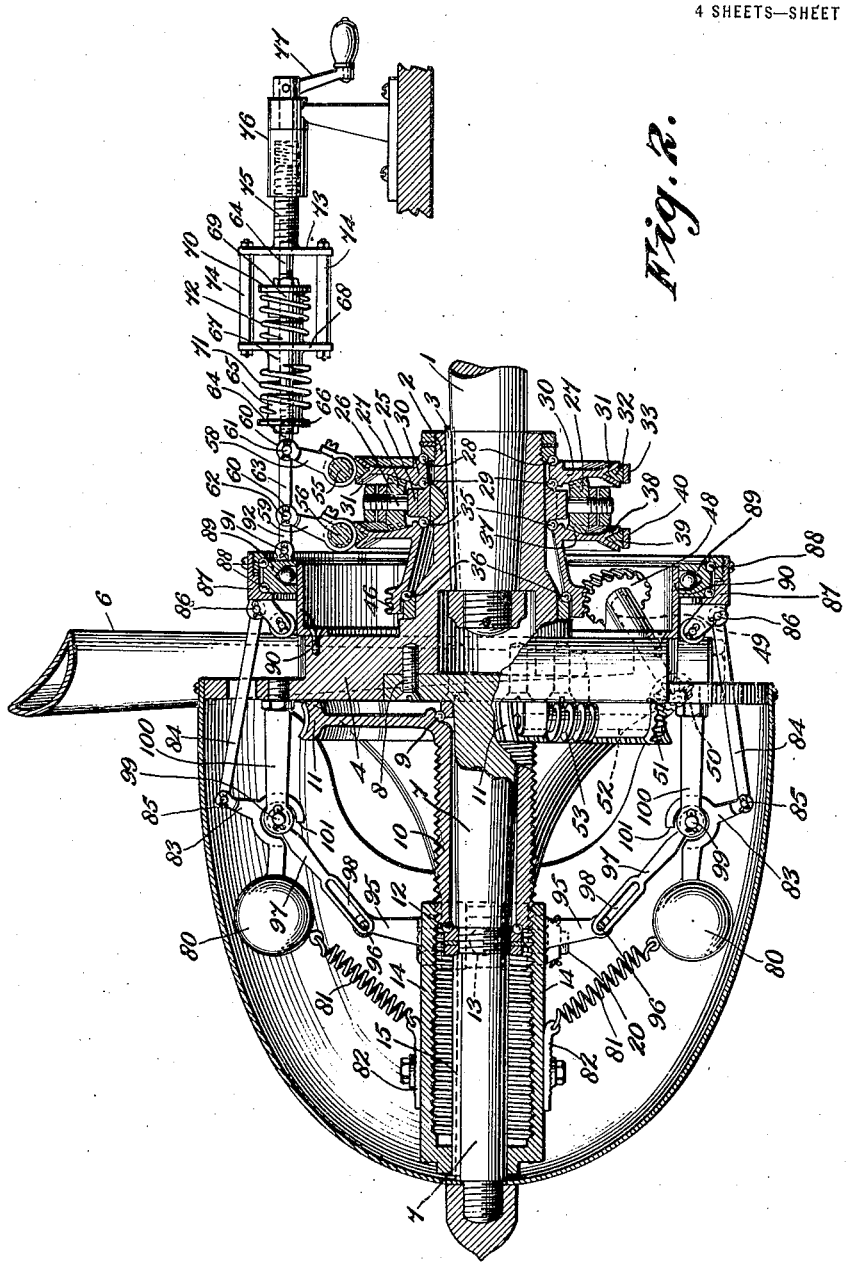

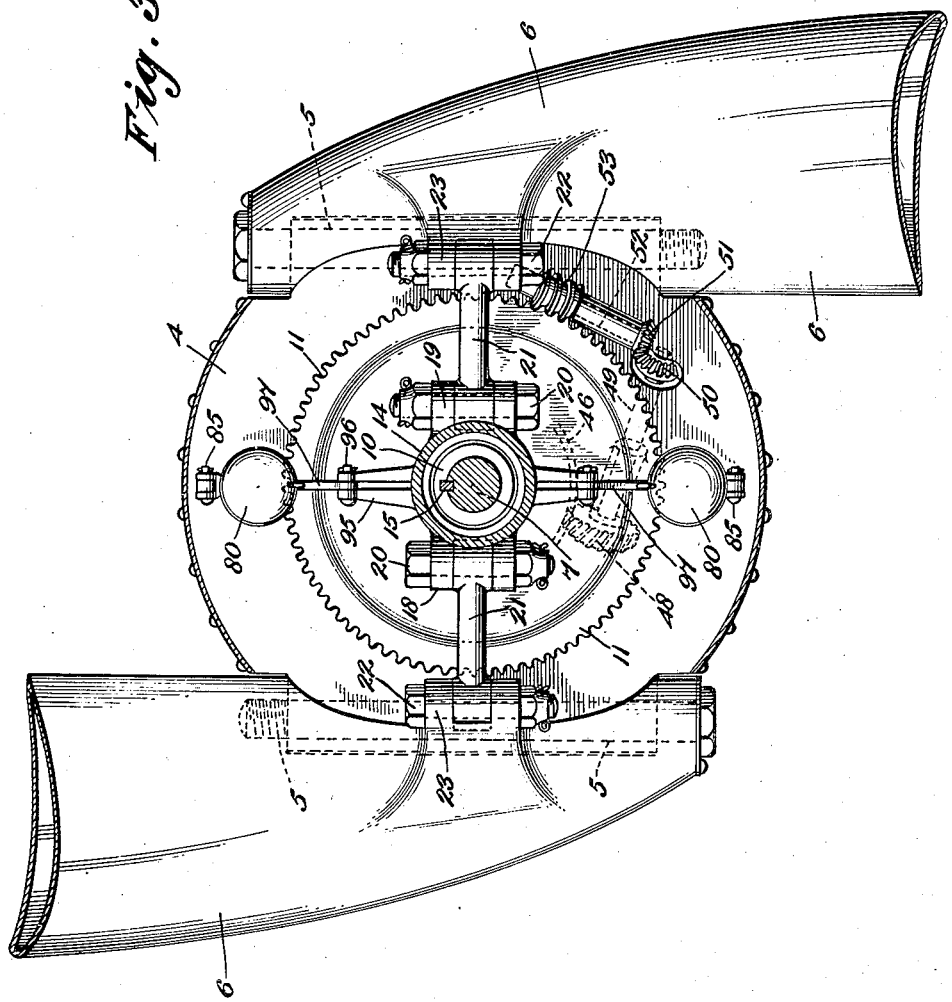

N. E. DAVIES.
REVERSING PROPELLER.
APPLICATION FILED APR. 7, 1920.
1,378,401.
Patented May 17, 1921.
4 SHEETS—SHEET 4.
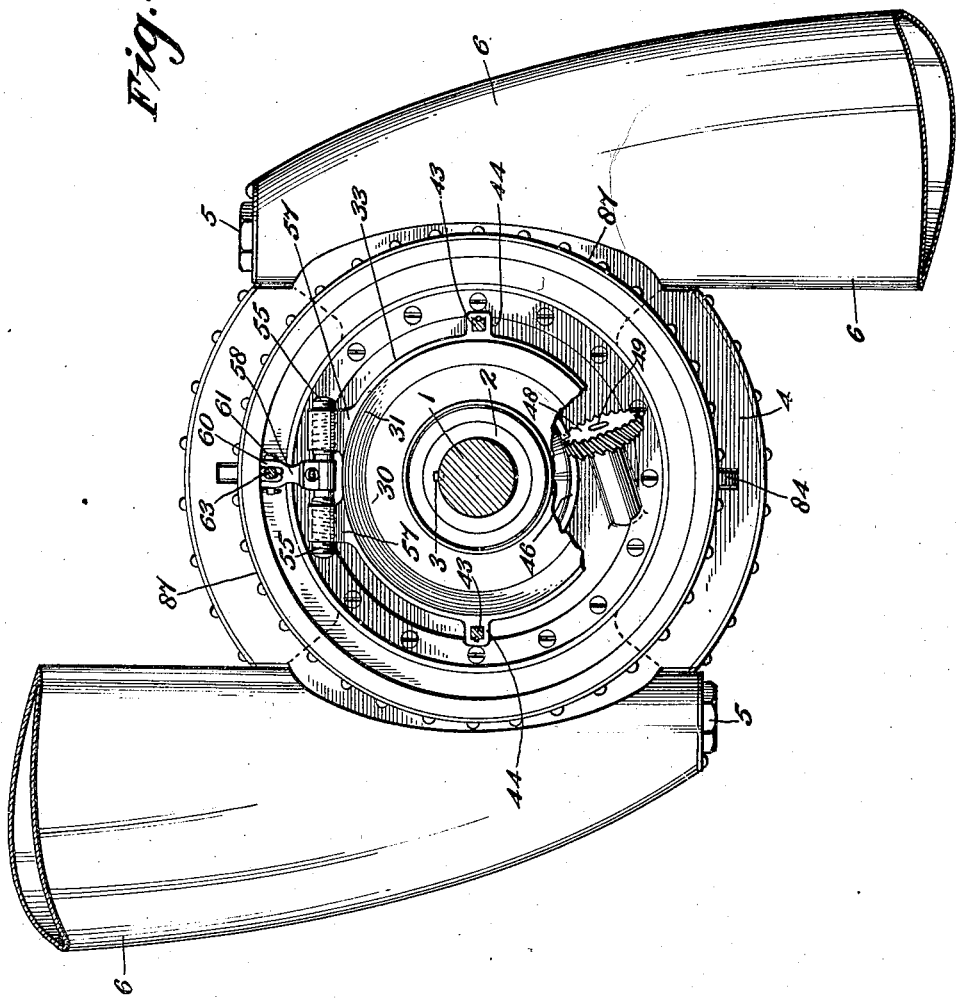
INVENTOR.
Nelson E. Davies, by
ATTORNEY.

UNITED STATES PATENT OFFICE.

NELSON E. DAVIES, OF REDWOOD CITY, CALIFORNIA.

REVERSING PROPELLER.

1,378,401.  Specification of Letters Patent.  Patented May 17, 1921.

Application filed April 7, 1920. Serial No. 371,935.

*To all whom it may concern:*

Be it known that I, NELSON E. DAVIES, a citizen of the United States, residing at Redwood City, in the county of San Mateo and State of California, have invented certain new and useful Improvements in Reversing Propellers; and I do hereby declare the following to be a full, clear and exact description of the invention, such as will enable others skilled in the art to which it appertains to make and use the same.

This invention relates to propellers for use in aeroplanes, motor boats, and wherever it is desired to change the pitch of the propellers while rotating.

It has for its object the provision of a speed and pitch changing means which will be simple in construction, comparatively inexpensive to manufacture, and more efficient in action than those heretofore proposed.

With these and other objects in view, the invention consists in the novel details of construction and combinations of parts more fully hereinafter described and particularly pointed out in the claims.

Referring to the accompanying drawings forming a part of this specification in which like numerals designate like parts in all the views:—

Fig. 2 is a longitudinal sectional view taken on the line 2—2 of Fig. 1, looking in the direction of the arrows;

Fig. 3 is a rear elevational view partially in section of the parts shown in Fig. 1; and Fig. 4 is a view taken on the line 4—4 of Fig. 1, looking in the direction of the arrows.

Figure 1:
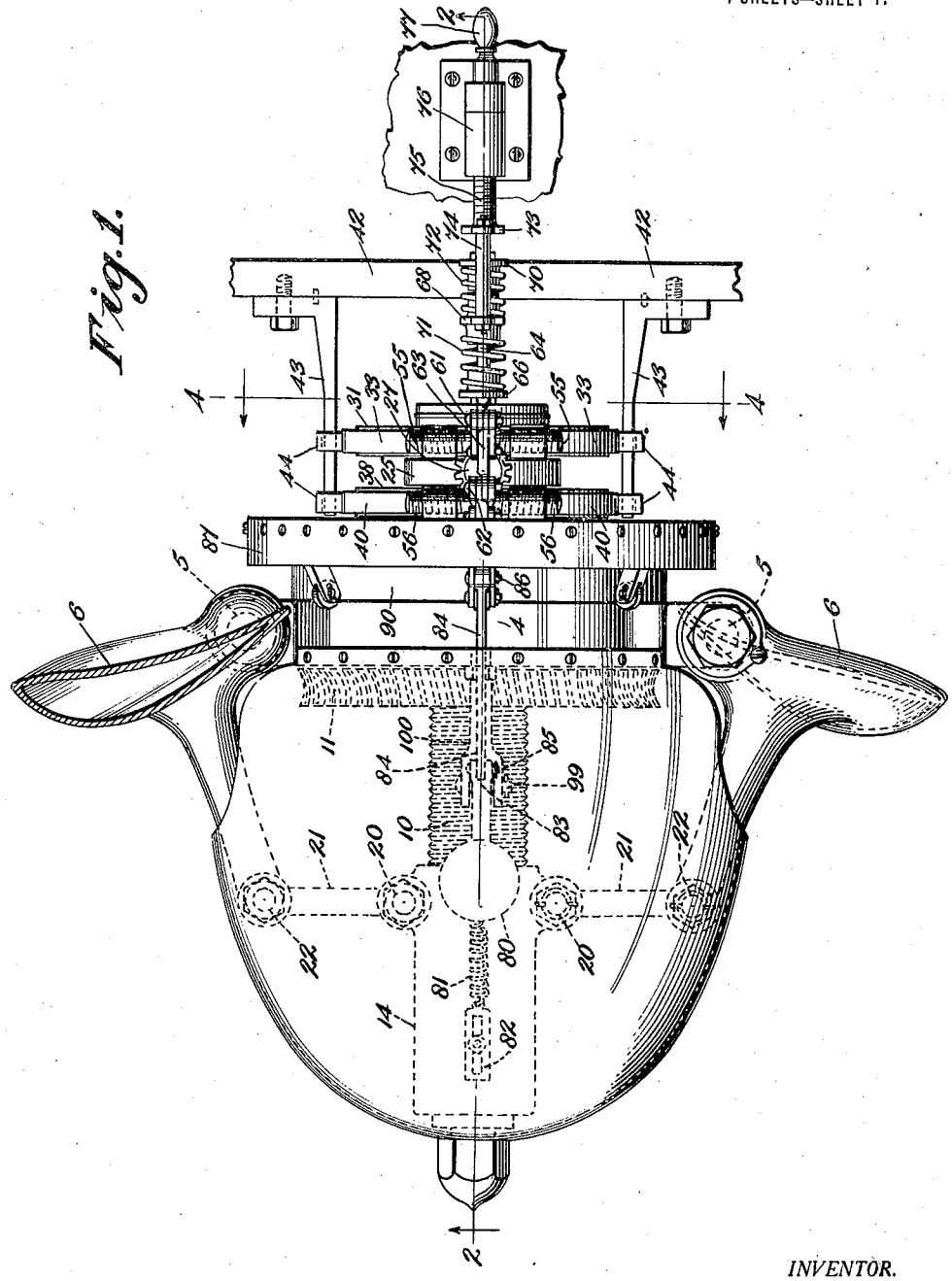
Figure 1 is a diagrammatic plan view of a propeller mechanism made in accordance with this invention.

1 indicates the main propeller or crank shaft, 2 a hub secured to shaft 1 by the key 3, 4 a flange on said hub 2 carrying the pivots 5 of the propeller blades 6 as best shown in Fig. 3, and 7 represents an extension of shaft 1, secured to said flange 4 as by the fastenings 8 and provided with the ball bearings 9. Mounted on said extension shaft 7 and bearing 9 is the screw threaded hub 10 of the worm gear 11 contacting at its rear end with the ball bearing 12 screw threaded to shaft 7 as at 13. 14 indicates a feed nut surrounding said shaft 7 and hub 10, and 15 a spline or key which causes the nut 14 to move longitudinally of the rotating shaft 7 under the action of the screw threaded hub 10.

As best shown in Fig. 3, the nut 14 carries the diametrically disposed lugs 18 and 19 provided with the pins 20 to which are pivoted at one end the arms or links 21, whose other ends are pivoted to the pins 22 carried by the lugs 23 rigid with the propeller blades 6. It thus will be clear that should the worm gear 11 be rotated, its threaded hub 10 will move the nut 14 longitudinally of the extension shaft 7, and that this movement will swing the blades 6 through the links 21 on their pivots 5, thus changing the pitch of said blades. Said worm gear 11 is rotated as follows. As best shown in Fig. 2, mounted on the hub 2 and rotating with the main shaft 1 is the collar 25, carrying the studs 26 on which are loosely mounted the pinions 27. Also mounted on said hub 2 are the ball bearings 28 and 29 between which is mounted the gear wheel 30 meshing with said pinions 27, and provided with the annular clutch member 32, controlled by the band 33. Also mounted on said hub 2 are the ball bearings 35 and 36 between which is mounted the gear 37 having the clutch member 38 controlled by the clutch member 39 controlled by the band 40. As will be clear from Fig. 1, 42 represents a stationary support or frame member from which extend the stationary brackets 43 carrying the supporting lugs 44 of the clutch controlling bands, 33 and 40. Suppose the band 33 to so move the clutch member 32 by means to be described, as to stop the gear 30 from rotating. In such case the shaft 1 through the hub 2, the collar 25, stub shafts 26 and pinions 27 will rotate the gear 37 and the worm 46 rigid with said gear 37. Said worm 46 is mounted on the ball bearing 36 and rotates the worm gear 48 mounted on the shaft 49 carrying the pinion 50 which meshes with the pinion 51 mounted on the shaft 52 carrying the worm 53 meshing with and rotating said worm 11. It thus results that the pitch of the propellers 6 will be changed while the shaft 1 is rotating.

The clutch members 32 and 39 are operated through the bands 33 and 40 as follows. Said bands are provided with the pairs of right and left hand screws, 55 and 56, which through the lugs 57 tighten or loosen said bands as they are turned in one direction or the other, all as will be clear from Figs. 1, 2 and 4. The screws 55 are operated by the arms 58, and the screws 56 are operated by the arms 59 through the bifurcated ends 60 through which respectively pass the pins 61 and 62. Said pins 61 and 62 are joined by the link 63, and said pin 61 is connected by the screw threaded member 64 to the nut member 65 carrying the collar 66. Slidably mounted on said rod member 64 is the hub member 67 carrying the collar 68, and next to said hub member is the second nut member 69 carrying the collar 70. Between the slidable hub member and adjustable nut member 65 is the coiled spring 71 and between said slidable hub member 67 and the second nut member 69 is the coiled spring 72. A collar 73 is joined to the collar 68 as by the rods 74 and a screw threaded extension 75 of said collar 73 fits a nut member 76 that may be rotated by the handle 77.

It thus results that by turning the handle 77, the pin 61 and arms 58 and 59 may be turned, and with said arms the screws 55 and 56, so that said clutch controlling belts 33 and 40 may be tightened or loosened.

80 represents centrifugal ball governors, and 81 represents springs attached to said governors at one end and at the other end to the adjustable means 82 secured to the nut 14. 83 indicates bell cranks to which said governors are attached, and 84 links attached to said bell cranks as by the pivot pins 85 secured as at 86 to the thrust collar 87 mounted on the ball bearings 88, carried by the ball supported collar 89. Said collar 89 is supported on the guiding drum 90 rigid with the flange 4 and propellers 6. Connected at one end to the collar 89 by the pin 91 is the link 92 whose other end is connected to the arm 59 and link 63 by the pin 62. It thus follows that the centrifugal ball governors 80 will, also, through the connections just described, move both arms 58 and 59, both bands 33 and 40, and both clutch members 32 and 39.

The longitudinal movements of the nut 14 are limited as follows. Said nut is provided with the oppositely disposed arms 95 provided with the pins 96 operating in the slots 98 of the arms 97 pivoted at 99 to the brackets 100.

The operation will be understood from the foregoing, but may be briefly summarized as follows: Upon rotating the shaft 1, the hub 2, flange 4, blades 6, extension shaft 7, nut 14, governor balls 80 and connections all rotate inside the clutch bands 33 and 40 carrying the clutch members 32 and 39 which latter are held from rotation by the supporting non-rotating members 42 and 43. It follows that the adjustable screw members 55 and 56 and their operating connections 89, 92, 63, 64 and 77 are likewise non-rotatable. The member 87, however, rotates on the ball bearings 88 outside said member 89, while the member 90 rotates inside said member 89. The construction being as just described, and it being remembered that said screws 55 and 56 are right and left handed, it is evident if one turns the handle 77 he will tighten one set of screws 55 or 56, while he loosens the other set. Accordingly, one clutch member 32 or 39 will be actuated to stop from rotating its corresponding gear 30 or 37, according to the direction in which the handle 77 is turned.

Should the gear 30 be thus prevented from rotating, the pinions 27 will run around said gear 30 as a track and thus turn the gear 37, the gears 46, 48, 50, 51 and 11 in the manner above described; and the turning of said gear 11, will turn the sleeve 10, move the nut 14, and thus move the links 21, Fig. 3, to change the pitch of the propeller blades 6, or even reverses them if the gear 11 is rotated for a sufficient time.

At high speeds the governor balls 80 and their connections force the ball thrust collar 87 to the right, as seen in Fig. 2, and thus force the links 92 and 63 in the same direction, which has the effect of turning the screws 55 and 56, and of operating the clutch members 32 and 39. With a slowing down of the speed, the reverse actions take place. The slots 98 in the links 97 limit the travel of the nut 14, and thus indirectly limits the action of the governor mechanism. For should the gear 30 be prevented from rotating by the centrifugal action of the balls 80 in the manner just disclosed, said nut 14, would move toward the right, as seen in Fig. 2, until the links 97 contact with the edges 101 of the bell cranks 83. When this contact takes place, the balls will be drawn inward, and the change in the pitch of the propellers will cease. The reverse movement of the nut 14 will produce a reverse effect.

If neither of the clutch members 32 and 39 are in engagement with their gears 30 and 37, then the governor balls 80 will function to maintain whatever speed has been originally set by manipulating the handle 77. But of course, by turning said handle at any time, the pitch of the blades 6, and therefore the speed may be suddenly changed, for said handle controls or overpowers the governor action.

It will now be clear that the members numbered 25 to 46 constitute a differential mechanism, which is controlled by the hand lever 77 and its connections, and that said differential mechanism and its connections serve to change the speed by changing the pitch of the propellers 6. In fact said pitch may be reversed by said last named connections. It is further obvious that said differential mechanism is under the control of the centrifugal governor balls 80 and their connections, that said balls govern the speed by controlling said differential gears, and that the pins 96 working in the slots 98 and their associated parts constitute a means for limiting the action of said balls 80.

It is obvious that those skilled in the art may vary the details of construction as well as the arrangement of parts without departing from the spirit of the invention, and therefore I do not wish to be limited to the above disclosure except as may be required by the claims.

What is claimed is:—

1. In a propeller mechanism, the combination of a power shaft; a propeller mounted on said shaft; a planetary differential gear concentrically mounted on said shaft; connections between said propeller and said gear adapted to change the pitch of said propeller; and a hand operated mechanism for governing said differential gears and said connections, substantially as described.

2. In a propeller mechanism, the combination of a power shaft; a propeller mounted on said shaft; a planetary differential gear concentrically mounted on said shaft; means comprising a worm gear having a screw threaded hub and a longitudinally movable nut member adapted to change the pitch of said propeller; connections between said differential gear and said worm gear; and a hand operated mechanism for governing said differential gear and said connections, substantially as described.

3. In a propeller mechanism the combination of a power shaft; a propeller mounted on said shaft; a differential gear mounted on said shaft; connections between said propeller and said gear comprising a screw threaded hub and a longitudinally movable nut member adapted to change the pitch of said propeller; and a hand operated mechanism comprising right and left hand screws and brake bands for governing said differential gear and said connections, substantially as described.

4. In a propeller mechanism the combination of a power shaft; a propeller mounted on said shaft; a differential gear mounted on said shaft; connections between said propeller and said gear adapted to change the pitch of said propeller; a governor mechanism; connections between said governor mechanism and said differential gear; and a hand operated mechanism for governing said differential gear and said connections, substantially as described.

5. In a propeller mechanism, the combination of a power shaft; a propeller mounted on said shaft; a differential gear mounted on said shaft; connections between said propeller and said gear adapted to change the pitch of said propeller; a governor mechanism; connections between said governor mechanism and said differential gear comprising a bell crank and a thrust collar connected to said bell crank; and a hand operated mechanism for governing said differential gear and said connections, substantially as described.

6. In a propeller mechanism, the combination of a power shaft; an extension of said shaft rigid therewith; a differential means concentrically carried, and operated by, said power shaft; a longitudinally movable nut carried by said extension; a plurality of propellers; connections between said nut and said propellers adapted to change the pitch of the latter; speed responsive means adapted to control said differential means; and connections between said differential means and said nut adapted to move said nut, substantially as described.

7. In a propeller mechanism, the combination of a power shaft; an extension of said shaft rigid therewith; a differential means concentrically carried, and operated by said power shaft; manually operated means for controlling said differential, said means adapted to permit of lost motion; speed responsive means adapted to automatically and independently control said differential means; a longitudinally movable nut carried by said extension; a plurality of propellers; connections between said nut and said propellers adapted to change the pitch of the latter; and connections between said differential means and said nut comprising a worm gear with a screw threaded hub adapted to move said nut, substantially as described.

8. In a propeller mechanism, the combination of a power shaft; an extension of said shaft rigid therewith; a differential means carried and operated by said power shaft; a longitudinally movable nut carried by said extension; a plurality of propellers; connections between said nut and said propellers adapted to change the pitch of the latter; a centrifugal governor mechanism adapted to control said differential means; and connections between said differential means and said nut adapted to move said nut, substantially as described.

9. In a propeller mechanism, the combination of a power shaft; an extension of said shaft rigid therewith; a differential means carried and operated by said power shaft; a longitudinally movable nut carried by said extension; a plurality if propellers; connections between said nut and said propellers adapted to change the pitch of the latter; a centrifugal governor mechanism comprising a ball supported thrust collar and connections adapted to control said differential means; means for limiting the movements of said governor mechanism; and connections between said differential means and said nut adapted to move said nut, substantially as described.

10. In a propeller mechanism, the combination of a power shaft; an extension of said shaft rigid therewith; a differential means carried and operated by said power shaft; a hand operated means adapted to control said differential means; a longitudinally movable nut carried by said extension; a governor mechanism associated with said nut also adapted to control said differential means; a plurality of propellers; connections between said nut and said propellers adapted to change the pitch of the latter; and connections between said differential means and said nut adapted to move said nut, substantially as described.

In testimony whereof I affix my signature.

NELSON E. DAVIES